United States Patent Office 2,927,692
Patented Mar. 8, 1960

2,927,692
CONCENTRATION OF MINERALS

Clinton A. Hollingsworth, Lakeland, Karl F. Schilling, Plant City, and Jordan L. Wester, Lakeland, Fla., assignors to Smith-Douglass Company, Incorporated, Norfolk, Va., a corporation of Virginia No Drawing. Application December 12, 1955
Serial No. 552,248

14 Claims. (Cl. 209—167)

This invention relates to the concentration of minerals and more particularly to the separation of silica from phosphatic material by the flotation processes such as froth flotation, skin flotation, flotation by continuous belt and by tabling, and the like. The invention aims to provide an improved method of separating silica by flotation from a mixture of phosphatic material and silica.

In its principal aspect, the invention involves subjecting the phosphate-silica mixture to a flotation operation at a pH within the range of 6 to 9 and in the presence of the polymerization condensation reaction product resulting from reacting at a temperature within the range of 300 to 425° F. (1) one molecular equivalent of a commercial polyamine with (2) from 2.5 to 18 molecular equivalents of a commercially crude heterogeneous fatty product selected from the group consisting of tall oil or tall oil pitch and equivalent crude fatty products of vegetable or animal origin, and floating off the silica while recovering a phosphate concentrate in the underflow of the flotation operation. The polymerization condensation reaction product is reversible in polarity depending upon the pH of the mineral pulp undergoing flotation, and the invention further involves subjecting the repulped silica float to a second flotation operation at a pH of at least and preferably higher than 10 and in the presence of a small quantity of fuel oil or the like, and recovering a phosphate concentrate in the overflowing float and discharging silica in the underflowing tailings of the second flotation operation.

The polymerization condensation reaction product (hereinafter called reagent) is prepared by heating a mixture containing from 2.5 to 18 molecular equivalents of the crude fatty product with one molecular equivalent of a commercial alkylene polyamine or a polyalkylene polyamine which in the interest of simplicity are herein collectively referred to as polyamines. Preferably the two reacting components are tall oil pitch, or crude tall oil, and commercial diethylene triamine which may also contain minor amounts of triethylene tetramine, tetraethylene pentamine and ethylene diamine. The reaction is effected by rapidly heating a mixture of the two reacting components to a temperature of from 300 to 425° F. in an open reactor at atmospheric pressure. The structure of the reaction product (reagent) is not known and no attempt has been made to determine its structure since the initial starting components are crude heterogeneous mixtures of various compounds, and we have found no reaction product prepared from pure (contrasted with commercially crude) starting components that will impart to the flotation operation the advantageous and economically desirable results achieved by the practice of our present invention.

The reagent used in the method of our invention behaves generally as a cationic or amine-type collector or promoter of flotation, but acts with greater rapidity then any prior art cationic reagent in furthering a separation of phosphate and silica. The method of the invention may hence be practiced for the bulk removal of silica from a phosphate ore or for floating silica in the amine or cleaner circuit of the double float practice currently in general use in the Florida phosphate field. When practiced in the amine or cleaner circuit, the method of the invention produces a silica-bearing float that is characterized by unusually large agglomerates of silica and other gangue material.

In the double float practice, the phosphate-bearing ore is prepared for concentration by various washing and sizing operations to remove colloidal material (slimes) and oversize particles which, if not removed, interfere with the flotation operation. The so-sized ore is mixed and conditioned with the proper quantities of a fatty acid, fuel oil and caustic soda, and is subjected to flotation in which the bulk of the phosphate values are removed in the froth (phosphate rougher concentrate). The phosphate float is deoiled by agitating with about 2 pounds of concentrated sulfuric acid per ton of concentrate in a slurry of from 20 to 50% solids, and is then dewatered, thoroughly rinsed and again dewatered, thus removing practically all of the residual reagents from previous treatments. The deoiled and deacidified rougher concentrate is then fed to the so-called amine or cleaner circuit where by the aid of a suitable cationic reagent a silica-bearing froth is removed and a phosphate concentrate is recovered in the underflow of the flotation operation. In the phosphate field, it is customary to call the phosphate product "concentrate," regardless of whether it is the floated product or the underflow of the flotation apparatus, and hence the silica float is designated as "tailings."

The reagent used in the method of the invention is derived from crude tall oil, tall oil pitch, or equivalent vegetable or animal oil distillation (still) residues and pitches including cottonseed oil pitch and residues from fat or grease recovery processes. Except for crude tall oil these fatty products are relatively surplus or waste materials finding but little application at present in industry. Distilled or purified oils are not desirable raw materials for the preparation of the reagent since reaction products similarly made therefrom do not exhibit the characteristics or the potency of the reagent made from one of the aforementioned crude fatty products.

Crude tall oil is obtained as a by-product in the manufacture of paper and is well known in industry. Its composition varies somewhat in different localities in that more or less rosin acids are present and due to this difference the ratio of other compounds in the tall oil changes accordingly. The composition of an average tall oil is about 40 to 50% fatty acid mixture, consisting of saturated and unsaturated acids, and from 50 to 60% rosin acid mixture, and from 2 to 8% of a mixture of unsaponifiable material. The fatty acid mixture consists of oleic, linoleic, traces of linolenic, palmitic, stearic, lignoceric and cerotic acids. The rosin acid mixture is composed of abietic acid, neoabietic acid, dihydroabietic acid, tetrahydroabietic acid, dehydroabietic acid, dextropimaric acid and isodextropimaric acid. The mixture of unsaponifiables consists of hydrocarbons, long chain alcohols and sterols. The hydrocarbon fraction consists of abietenes and diterpenes, and the long chain alcohols are predominantly lignoceryl alcohol.

Components in tall oil pitch are about the same as in crude tall oil but in different proportions. In the pitch there are from 30 to 40% unsaponifiables and only from 40 to 60% combined rosin acids and fatty acids along with minor amounts of polymerization products. Other pitches, still residues, oil foots and the like, of vegetable or animal origin, are of similar nature in that only small percentages of fatty acids are present. In these products the other constituents do not usually include any rosin acids but are instead polymerization products and other non-saponifiable materials.

For economic reasons the preferred polyamine used in the preparation of the reagent is commercial diethylene triamine which also contains minor amounts of triethylene tetramine, tetraethylene pentamine and ethylene diamine. Any commercial alkylene polyamine or polyalkylene polyamine is, however, suitable. In preparing the reagent one molecular equivalent of the polyamine is reacted with from 2.5 to 18 molecular equivalents of the fatty product, based on an average combining weight of 340 for the fatty product, which is the combining weight of most crude tall oils and close to the combining weight of tall oil pitch and equivalent crude fatty products. Reacting diethylene triamine with the fatty product, a molar ratio of 1 to 2.5–6 is the most advantageous, and when reacted with tall oil or tall oil pitch excellent results are attained with a molar ratio of 1 to 3. Reacting triethylene tetramine with the fatty product, from 2.5 to 12 molecular equivalents of fatty product for each molecular equivalent of this polyamine is preferable, and with tetraethylene pentamine from 2.5 to 18 molecular equivalents of fatty product may advantageously be reacted with one molecular equivalent of the polyamine.

According to the present preferred method of preparing the reagent, 9 parts by weight (i.e. 3 molecular equivalents) of tall oil pitch (or tall oil or equivalent crude fatty product) are thoroughly mixed with 1 part by weight (i.e. 1 molecular equivalent) of crude commercial diethylene triamine at a temperature just high enough to melt the pitch (or at room temperature if liquid reactants are used). This mixture is heated as rapidly as possible and quickly attains a temperature of 240° F. Water then begins to come off and the temperature rises more gradually to 315° F. with some frothing of the reacting mixture. At 315° F. the temperature again begins to rise rapidly, and at 400–425° F. the reaction is substantially complete and the reagent is ready for use.

The reagent is insoluble and non-dispersible in water, and hence is customarily used in solution in a suitable hydrocarbon distillate, such as kerosene, or in any one of the commonly-used frother alcohols. In addition to kerosene, other hydrocarbon distillates such as benzol, naphtha, fuel oil, and the like may be equally well used as solvents. Suitable frother alcohols are di-isobutyl carbinol, methyl isobutyl carbinol, mixed primary amyl alcohols, and the like. The frothing quality of the alcohol is not a required characteristic in mixtures of the reagent therewith, since the reagent serves equally well where no type of frother is present. The reagent does not itself possess any frothing characteristic, and its activity and efficiency as a cationic flotation collector or promoter are primarily due to its unusually strong agglomerating action and the rapidity with which agglomerates are formed.

In order to facilitate solution, the hot reagent is run into the solvent (e.g. kerosene) in which it is intended to be used as soon as it has cooled sufficiently to prevent any hazard from combustion of the solvent, and is made up to the desired concentration in the solvent, generally in the proportion of from 10 to 60% by weight of reagent to 90 to 40% by weight of solvent. The preferred range of pH of the reagent or of the reagent in a neutral solvent is from 7.4 to 8.4, more specifically 8.25 pH, as a silica collector in the separation of silica from phosphate in flotation processes. The cool reaction mixture, when not diluted with solvent while hot, sets to a hard and difficultly-soluble mahogany-colored solid. For this reason it is preferred to dilute the hot reaction product with at least a portion of the solvent. When the reagent-solvent mixture is made up to contain 1 part of reagent and 4 parts of kerosene, a reagent mixture results which, when applied as the collector-promoter in the cleaner or amine circuit of the double-float phosphate flotation process, yields a superior performing collector which rapidly agglomerates the particles of silica, silicates, heavy minerals and other gangue materials into a tightly agglomerated overflow froth.

Although it is preferred to use reactants which do not contain water, the fact that tall oil usually contains water and commercial ethylene diamine, for example, contains from 15 to 40% water in no way interferes with the preparation of the reagent. This water is generally expelled during the reaction, passing off at a temperature below 260° F., at which temperature water formed by the reaction itself begins to pass off.

In order to facilitate the handling of pitches, still residues, and even crude tall oil, these may be cut or diluted with a fluid fuel oil of, for example, 20° API, kerosene or other suitable petroleum distillate, and in the cases where these are not desirable with any other high boiling point diluent. The polymerization condensation reaction is then carried out in the presence of the diluent which has the beneficial effect of reducing froth during the reaction. The final temperature of reaction is not altered and an equally potent and efficient reagent is produced by this procedure which has the further advantage of permitting pumping of both reacting materials. Dilution may be to the extent of 50% of the pitch (or other residual product) used, in which case of course the ratio of pitch plus diluent to polyamine is increased two-fold. When the reagent (reaction product) is prepared with a mixture of fuel oil (or other diluent and pitch (or other residual product) and is made into a reagent-solvent mixture for use in the flotation process, the quantity of fuel oil (or other diluent) present is considered as part of the required kerosene (or other reagent-solvent), since the pitch-diluent and reagent-solvent function similarly in the flotation process.

Close pH control in the preparation of the reagent is very important, but after the reagent (or a solution thereof in a neutral solvent) has been prepared with a pH within the aforementioned ranges, the pH of the mineral pulp to which it is added as a silica collector may vary within the range of 6 to 9. For example, the deoiled and deacidified phosphate rougher concentrate in the double float practice customarily has a pH around 6.5 (and occasionally even lower), and when diluted with water of a pH around 7.2 gives a mineral pulp whose pH is in the neighborhood of 7. The reagent having a pH between 7.4 and 8.4 (and preferably about 8.25 at which pH optimum separation is attained) functions particularly well as a silica collector in such a pulp. On the other hand, the potency of the reagent is sharply reduced by treatment thereof with a strong mineral acid. Moreover, the potency of the reagent as a silica collector decreases when the pH of the mineral pulp undergoing flotation is about 9 and higher. In a mineral pulp having a pH of about 10 and higher, the polarity of the reagent reverses and it becomes a collector for phosphate values.

Taking advantage of the reversible polarity of the reagent, a further aspect of the method of the invention involves refloating and cleaning a silica-bearing froth by control of the pH of the pulp undergoing flotation. Thus a silica-bearing froth produced with the reagent by the method of the invention is collected, dewatered and conditioned in a thick pulp of from 40 to 70% solids in the presence of sufficient sodium hydroxide (NaOH) solution to produce a pH of from 10 to 14 (and more specifically 12.5) and from 0.3 pounds to 2.0 pounds of fuel oil per ton of dry solids in the froth. After conditioning for from 15 to 90 seconds, the mixture is subjected to a flotation process, the polarity of the reagent reverses, and a phosphate-bearing froth is collected while most of the silica and other gangue materials remain in the flotation cell. The reagent cannot be regenerated to a silica collector no matter what pH is given the pulp. But, by bringing the floated phosphate-bearing material to a pH of 6.5 to 7.5 and refloating, the residual silica, heavy minerals and other gangue materials drop out in the tailings and a high grade phosphate froth is produced. Other variations of pH yield more or less contaminated products.

We are unable to explain the mechanics of the reversibility of the reagent, although there is evidence that the reaction product (reagent) may be in the nature of a tall oil (or equivalent fatty product) salt of polydiacyl diethylene triamine which is a silica collector. When a phosphate-rich silica float obtained with the reagent is made strongly alkaline with sodium hydroxide, the weak salt bond may be ruptured and the liberated tall oil may then react with the excess sodium hydroxide to form a soap on the already coated phosphate particles and at the same time deactivating the original silica collector. When a small amount of fuel oil is now added to the pulp, the soap-coated phosphate particles float free of the silica on which the reagent is deactivated. The explanation is offered without prejudice and with no intention of restricting the invention thereto.

The improved and superior results attained by the practice of the invention are due to the unique properties of the reagent. It is neither soluble nor dispersible in water, is incapable of forming acid addition salts, and is almost completely deactivated by concentrated sulphuric acid. It is reversible in polarity by pH adjustment of the mineral pulp undergoing flotation. It has a molecular weight of from 1000 to 6000, based on a combining weight of 340 for the fatty product. It has a satisfactory selectivity and superior potency. The superior potency of the reagent is evidenced by the rapidity with which it functions after introduction into the mineral pulp and by the smaller amount of reagent required. The low cost of the reagent itself and the decreased amount required are among its special economic advantages. Additionally, the reagent very rapidly agglomerates particles of silica, silicates, heavy minerals (e.g. ilmenite, rutile, zircon, staurolite and kyanite) and other gangue materials into a tightly agglomerated overflow froth. The rapidity with which such agglomerates are formed upon introducing the reagent into the mineral pulp accounts, we believe, for the fact that the reagent functions satisfactorily as a silica collector in neutral or even slightly acid (e.g. pH of 6–7) pulps, whereas close pH control of the reagent itself is important.

The pH of the reagent is determined by subjecting to the conventional method of pH measurement a mixture of equal volumes of (1) methanol and (2) a solution made up of 30% reagent and 70% kerosene. The observed pH reading of that measurement is taken as the pH of the reagent (reaction product). By such a pH determination, the reactants (i.e. fatty product and polyamine) are so selected or controlled that the pH of the reaction product (reagent) is within the range of 7 to 9, and preferably within the range of 7.4 to 8.4 as a silica collector. With substantially neutral solvents for the fatty product (when used) and for the reagent, the initial pH of the reagent-solvent mixture when introduced into the mineral pulp will be substantially the same as that of the reagent itself.

The following examples illustrate the effectiveness of the invention in separating silica from phosphate. In all examples only the actual amount of the reagent (collector) is reported. The amount of reagent-solvent mixture may be readily calculated from the ratio of reagent to solvent in the mixture. The pH of the reagent-solvent mixture when introduced into the aqueous pulp of the phosphate-silica mixture was within the range of 7 to 9 and usually between 7.4 and 8.4, while the pH of the pulp undergoing flotation and after the introduction of the reagent-solvent mixture was usually between 7 and 8. Except as otherwise noted the tests were carried out in a laboratory size Fagergren flotation machine, silica, silicates, heavy minerals and other gangue materials being floated and reported as "tails." The Examples are in no way to be construed as limiting the scope of the invention.

EXAMPLE 1

The reagent used was prepared from 72 grams of crude tall oil and 8 grams of commercial diethylene triamine; a molar ratio of approximately 3 to 1. The two reactants were mixed cold and when thoroughly mixed the mixture was rapidly heated to 400° F. The hot reaction product (reagent) was diluted with kerosene to produce a mixture of 20% reagent and 80% kerosene and was so used in the tests.

The deoiled rougher flotation concentrate which was used as feed analyzed 70.69% BPL (bone phosphate of lime) and 12.56% silica determined (as customary in the phosphate industry) as insolubles.

| Test No. | Conc. Percent BPL | Conc. Percent Insol. | Tails, Percent BPL | Percent BPL Recovery | Reagent, lbs./ton Conc. |
|---|---|---|---|---|---|
| 1 | 74.27 | 7.37 | 13.02 | 98.9 | 0.07 |
| 2 | 77.00 | 4.90 | 15.14 | 97.8 | 0.15 |
| 3 | 78.23 | 3.82 | 18.45 | 96.7 | 0.23 |
| 4 | 79.30 | 3.21 | 18.97 | 96.1 | 0.31 |

EXAMPLE 2

The reagent used was the same as in Example 1, but in a mixture of 30% reagent and 70% kerosene. The feed was a deoiled rougher floatation concentrate as in Example 1.

| Test No. | Conc. Percent BPL | Conc. Percent Insol. | Tails, Percent BPL | Percent BPL Recovery | Reagent, lbs./ton Conc. |
|---|---|---|---|---|---|
| 1 | 77.02 | 4.48 | 12.15 | 98.4 | 0.35 |
| 2 | 77.90 | 3.59 | 14.09 | 97.7 | 0.54 |
| 3 | 78.95 | 2.69 | 13.98 | 97.5 | 0.73 |
| 4 | 78.47 | 2.40 | 15.62 | 97.2 | 0.90 |

This reagent mixture handles well and it will be noted that an appreciable decrease in phosphate value in the tails is obtained.

EXAMPLE 3

The reagent used was the same as in Example 1, but in a mixture of 40% reagent and 60% kerosene. The feed was again a deoiled rougher flotation concentrate as in Example 1.

| Test No. | Conc. Percent BPL | Conc. Percent Insol. | Tails, Percent BPL | Percent BPL Recovery | Reagent, lbs./ton Conc. |
|---|---|---|---|---|---|
| 1 | 78.23 | 3.97 | 10.38 | 98.4 | 0.48 |
| 2 | 78.69 | 2.96 | 11.34 | 98.0 | 0.75 |
| 3 | 79.45 | 2.84 | 13.81 | 97.5 | 0.91 |

EXAMPLE 4

The reagent used was the same as in Example 1, but in a mixture of 50% reagent and 50% kerosene. This resulted in a very viscous difficultly pumpable reagent mixture and results are not improved by the heavy concentration of reagent. The feed was the same as in Example 1.

| Test No. | Conc. Percent BPL | Conc. Percent Insol. | Tails, Percent BPL | Percent BPL Recovery | Reagent, lbs./ton Conc. |
|---|---|---|---|---|---|
| 1 | 75.89 | 6.27 | 7.10 | 99.1 | 0.32 |
| 2 | 78.03 | 3.55 | 11.28 | 98.2 | 0.65 |
| 3 | 78.60 | 3.21 | 13.81 | 97.6 | 0.83 |
| 4 | 78.53 | 2.96 | 13.77 | 97.6 | 0.98 |

EXAMPLE 5

The tests of the foregoing examples were carried out in a laboratory flotation machine. The tests of the present example were conducted on a commercial plant scale. The reagent used was the same as in Example 1, in a mixture of 20% reagent and 80% kerosene. The feed was a deoiled rougher flotation concentrate having an average analysis of 74.53% BPL and 7.33% insolubles.

| Test No. | Conc. Percent BPL | Conc. Percent Insol. | Tails, Percent BPL | Percent BPL Recovery | Reagent, lbs./ton Conc. |
|---|---|---|---|---|---|
| 1 | 77.00 | 3.33 | 40.97 | 96.2 | 0.28 |
| 2 | 77.02 | 3.04 | 40.96 | 96.7 | 0.42 |
| 3 | 79.01 | 2.64 | 41.98 | 92.6 | 0.49 |

EXAMPLE 6

In the foregoing examples, the effectiveness of the reagent in removing silica and other gangue materials from a deoiled rougher flotation concentrate is shown. In the present example the feed was a raw phosphate ore from which a much greater amount of impurities needed to be removed. Thus, the feed was a deslimed phosphate ore which had been screened through a 14 mesh Tyler sieve to remove the oversize. It analyzed 23.58% BPL and 68.03% insolubles, and was used without additional treatment or conditioning.

| Conc. Percent BPL | Conc. Percent Insol. | Tails, Percent BPL | Percent BPL Recovery | Reagent, lbs./ton Conc. |
|---|---|---|---|---|
| 67.43 | 15.89 | 3.80 | 88.5 | 0.6 |

The reagent showed excellent potency in upgrading the phosphatic material.

No attempt was made in this test to produce a finished concentrate. The purpose of the test was to illustrate the effectiveness of the reagent in producing a rougher concentrate by making a bulk silica removal. This rougher concentrate is comparable to that obtained in the present conventional fatty acid-fuel oil-caustic float, but does not require the costly deoiling step. This effects a noteworthy saving in that no sulfuric acid is required and no attrition loss occurs. The rougher concentrate from the bulk silica removal can be directly transported to the cleaner circuit for removal of residual silica, without even dewatering, in a properly planned flow sheet.

EXAMPLE 7

In order to illustrate the effectiveness of the reagent in a solvent other than kerosene, the reagent was made up in a 50/50 mixture with Acintene C a sulfated turpentine product produced by Arizona Chemical Company. Acintene C has no collector properties, but does exhibit frothing qualities. The reagent used was the same as in Example 1. The feed was the same as in Example 6.

| Conc. Percent BPL | Conc. Percent Insol. | Tails, Percent BPL | Percent BPL Recovery | Reagent, lbs./ton Conc. |
|---|---|---|---|---|
| 70.29 | 16.02 | 4.72 | 86.1 | 0.67 |

EXAMPLES 8 TO 11

These examples show the results of several days continuous plant run of phosphate flotation using the reagent prepared in a ratio of 9 parts crude tall oil and 1 part commercial diethylene triamine. Feed to the amine flotation section of the plant consisted of a rougher phosphate flotation concentrate obtained by the present conventional fatty acid-fuel oil-caustic process. This rougher phosphate concentrate was thoroughly deoiled by agitation in the presence of sulfuric acid and then rinsed thoroughly with water. The feed was then subjected to a cleaner flotation step using the new reagent in a mixture of 20% reagent and 80% kerosene. A silica-bearing froth was removed and a finished phosphate concentrate was continuously discharged in the underflow. The feed had an average analysis of 72.28% BPL and 10.73% insolubles.

| Test No. | Conc. Percent BPL | Conc. Percent Insol. | Tails, Percent BPL | Percent BPL Recovery | Reagent, lbs./ton Conc. |
|---|---|---|---|---|---|
| Example 8 | 75.63 | 2.60 | 28.33 | 93.3 | 0.31 |
| Example 9 | 76.35 | 2.12 | 29.44 | 97.1 | 0.60 |
| Example 10 | 75.76 | 3.24 | 29.44 | 96.2 | 0.41 |
| Example 11 | 76.60 | 2.97 | 28.00 | 98.0 | 0.61 |
| Comp. avg | 76.09 | 2.73 | 28.80 | 96.8 | 0.48 |

EXAMPLE 12

The reagent was made by heating a mixture of 70 parts of tall oil pitch and 8.5 parts of commercial diethylene triamine to 400° F. where the reaction is complete. The reagent was used in a mixture of 70% kerosene and 30% reagent in the amounts noted. In Part I, the feed was a raw phosphate ore analyzing 39.40% BPL and 49.61% insolubles which had been previously deslimed, and in Part II, the feed was a deoiled rougher phosphate concentrate analyzing 74.64% BPL and 7.40%.

Part I

| Test No. | Conc. Percent BPL | Conc. Percent Insol. | Tails, Percent BPL | Percent BPL Recovery | Reagent, lbs./ton Conc. |
|---|---|---|---|---|---|
| 1 | 57.03 | 26.70 | 11.36 | 88.51 | 0.32 |
| 2 | 62.89 | 20.71 | 12.56 | 85.13 | 0.45 |
| 3 | 67.78 | 13.93 | 17.04 | 74.08 | 0.60 |

Part II

| Test No. | Conc. Percent BPL | Conc. Percent Insol. | Tails, Percent BPL | Percent BPL Recovery | Reagent, lbs./ton Conc. |
|---|---|---|---|---|---|
| 1 | 77.40 | 4.01 | 19.05 | 98.79 | 0.21 |
| 2 | 78.79 | 2.89 | 23.42 | 98.08 | 0.32 |
| 3 | 80.17 | 2.66 | 27.47 | 97.61 | 0.42 |

EXAMPLE 13

This example illustrates the effect of one of the frother alcohols on the float when the reagent is used as a collector. It will be noted that the frother alcohol does not promote the float. The reagent was the same as used in Example 12, except that it was used in a mixture of 50% reagent and 50% di-iso-butyl carbinol. The feeds in Parts I and II were the same as in Parts I and II, respectively, of Example 12.

Part I

| Test No. | Conc. Percent BPL | Conc. Percent Insol. | Tails, Percent BPL | Percent BPL Recovery | Reagent, lbs./ton Conc. |
|---|---|---|---|---|---|
| 1 | 46.78 | 40.04 | 12.61 | 92.02 | 0.51 |
| 2 | 49.38 | 39.55 | 15.51 | 89.74 | 0.75 |
| 3 | 48.29 | 40.01 | 27.75 | 82.13 | 1.00 |

Part II

| Test No. | Conc. | | Tails, Percent BPL | Percent BPL Recovery | Reagent, lbs./ton Conc. |
|---|---|---|---|---|---|
| | Percent BPL | Percent Insol. | | | |
| 1 | 75.93 | 4.49 | 46.21 | 95.67 | 0.37 |
| 2 | 76.63 | 4.51 | 50.54 | 93.57 | 0.55 |
| 3 | 77.24 | 4.64 | 51.46 | 94.50 | 0.74 |

EXAMPLE 14

The reagent used in this example was prepared by reacting 72 parts of a grease recovery residue pitch with 8.5 parts of diethylene triamine at 400° F. The reaction product was made into a fluid mixture with kerosene in the proportions of 30% reagent and 70% kerosene. The feed was a deoiled rougher phosphate concentrate analyzing 74.64% BPL and 7.40% insol.

| Test No. | Conc. | | Tails, Percent BPL | Percent BPL Recovery | Reagent, lbs./ton Conc. |
|---|---|---|---|---|---|
| | Percent BPL | Percent Insol. | | | |
| 1 | 75.93 | 5.20 | 11.69 | 99.46 | 0.38 |
| 2 | 77.07 | 4.13 | 18.40 | 98.94 | 0.55 |
| 3 | 76.89 | 3.97 | 22.07 | 98.36 | 0.75 |

EXAMPLE 15

This example illustrates the unique characteristic of the reagent of polarity reversion; the reagent acting first as a silica collector and then as a phosphate collector.

A raw feed which had been thoroughly deslimed and then screened to remove all plus 14 mesh material was used in the tests. The feed analyzed 39.55% BPL and contained 49.39% insolubles.

The feed was weighed into a laboratory flotation cell and the pulp diluted to approximately 10% solids. The reagent used in test No. 1 was prepared from tall oil pitch (and in tests Nos. 2, 3 and 4 from tall oil) and commercial diethylene triamine in molecular equivalents of approximately 3 to 1, respectively, and in all tests was used in a mixture of 30% reagent and 70% kerosene. pH of the raw feed was 7.70 and after the addition of reagent increased to 7.78. The pulp and reagents were conditioned with air off for 3 seconds in order to diffuse the reagent through the pulp, then air was admitted and a silica bearing froth was removed which was rich in phosphate, leaving the phosphate concentrate (Conc. I) in the underflow. The froth product (Orig. Tails) was then dewatered to about 50% solids and transferred to a laboratory conditioner where the appropriate quantity of fuel oil (see table) and sodium hydroxide sufficient to raise the pH to from 10 to 14 were added and this pulp conditioned for 30 seconds, after which it was transferred to the flotation cell and a phosphate float concentrate removed leaving the silica and other gangue materials in the underflow. This is Tail I in the table and was discarded. The phosphate froth was returned to the flotation cell and its pH adjusted to from 7.0 to 8.5 with sulfuric acid and refloated to remove a phosphate float concentrate (Conc. II), while in the underflow the residual silica and other gangue materials were dropped out, constituting Tails II in the table. The original tailing was calculated.

| Test No. | 1st Float Products | | | | Refloat Products | |
|---|---|---|---|---|---|---|
| | Conc. I | | Orig. Tails, Percent BPL | Tails I, Percent BPL | Tails II, Percent BPL | Conc. II | |
| | Percent BPL | Percent Insol. | | | | Percent BPL | Percent Insol. |
| 1 | 69.38 | 13.57 | 19.13 | 6.16 | 29.19 | 68.83 | 14.83 |
| 2 | 66.06 | 15.92 | 13.58 | 2.40 | 4.72 | 63.00 | 22.59 |
| 3 | 72.22 | 6.70 | 21.58 | 0.66 | 2.62 | 59.33 | 24.70 |
| 4 | 68.57 | 12.64 | 14.36 | 2.23 | 11.49 | 37.61 | 53.24 |

| Test No. | Percent BPL Recovery | | | Reagents Used, lb./Ton of Original Feed | | | |
|---|---|---|---|---|---|---|---|
| | Conc. | | Total | 1st Float Reagent | NaOH | Refloat Reagents | |
| | I | II | | | | Fuel Oil | H₂SO₄ |
| 1 | 72.32 | 11.37 | 83.69 | 0.77 | 1.15 | 0.31 | 1.1 |
| 2 | 82.94 | 14.00 | 96.94 | 0.82 | 2.30 | 0.60 | 1.1 |
| 3 | 63.65 | 35.03 | 98.68 | 0.88 | 2.48 | 0.94 | 0.8 |
| 4 | 79.90 | 12.15 | 92.05 | 0.78 | 2.61 | 0.54 | 1.1 |

In Test No. 4 the fuel oil contained 20% of tall oil to show that free tall oil is not helpful to the float and the reversion cannot be due to the presence of free tall oil in the original reagent.

This Example 15 embodies the further aspect of the invention which involves the reversibility of the reagent by pH control of the mineral pulp undergoing flotation, thus permitting the removal of a phosphate concentrate float from the original silica float tailings merely by adjustment of the pH values. The same reagent used to float the silica in the first flotation step is used in a second flotation step to float the residual phosphate values in the silica float merely by thickening the silica froth somewhat, adding caustic to a high pH, adding a very small amount of fuel oil, conditioning for 30 seconds, and then floating off the phosphate. A rough pH control of the pulp is all that is required. No additional collector reagent is added and the polarity of that very small quantity already on the froth particles reverses and accomplishes the second and third (cleaner) flotation steps.

EXAMPLE 16

In preparing the reagent, 96 grams (0.28 mol) of tall oil was reacted with 10 grams (0.05 mol) of tetraethylene pentamine by heating to 420° F. where the reaction was complete. The ratio of polyamine to tall oil was 1 mol to 5.6 mols. The reaction product obtained was, on cooling, a dark brown to black solid. This was made into a mixture of kerosene 70% and reagent 30%. In Part I, the feed was a raw phosphate ore which had been screened through 14 mesh and thoroughly deslimed, analyzing 38.43% BPL and 50.37% insolubles. In Part II, the feed was a deoiled rougher concentrate analyzing 72.49% BPL and 9.61% insolubles.

*Part I*

| Test No. | Conc. | | Tails, Percent BPL | Percent BPL Recovery | Reagent, lbs./ton Conc. |
|---|---|---|---|---|---|
| | Percent BPL | Percent Insol. | | | |
| 1 | 58.67 | 25.48 | 5.72 | 94.3 | 1.35 |
| 2 | 61.75 | 20.92 | 8.22 | 91.1 | 1.67 |

*Part II*

| Test No. | Conc. | | Tails, Percent BPL | Percent BPL Recovery | Reagent, lbs./ton Conc. |
|---|---|---|---|---|---|
| | Percent BPL | Percent Insol. | | | |
| 3 | 78.34 | 3.04 | 9.72 | 99.0 | 0.39 |
| 4 | 77.86 | 2.55 | 10.51 | 98.9 | 0.47 |

EXAMPLE 17

In preparing the reagent, 60 grams (0.18 mol) tall oil was reacted with 10 grams (0.07 mol) triethylene tetramine by heating to 420° F. where the reaction was complete. The ratio of polyamine to tall oil was 1 mol to 2.57 mols. The reaction product obtained was made into a mixture 70% kerosene and 30% reagent. In Part I, the feed was minus 14 mesh raw phosphate ore thoroughly deslimed, analyzing 38.43% BPL and 50.37% insolubles. In Part II, the feed was a deoiled rougher concentrate analyzing 72.49% BPL and 9.61% insolubles.

*Part I*

| Test No. | Conc. | | Tails, Percent BPL | Percent BPL Recovery | Reagent, lbs./ton Conc. |
|---|---|---|---|---|---|
| | Percent BPL | Percent Insol. | | | |
| 1 | 54.19 | 31.75 | 9.00 | 91.9 | 1.19 |
| 2 | 58.06 | 25.77 | 13.46 | 84.8 | 1.80 |

*Part II*

| Test No. | Conc. | | Tails, Percent BPL | Percent BPL Recovery | Reagent, lbs./ton Conc. |
|---|---|---|---|---|---|
| | Percent BPL | Percent Insol. | | | |
| 3 | 77.79 | 2.02 | 14.84 | 98.2 | 0.40 |
| 4 | 76.63 | 4.19 | 12.67 | 98.9 | 0.31 |

EXAMPLE 18

In preparing the reagent, 204 grams (0.6 mol) of tall oil was reacted with 18.9 grams (0.1 mol) tetraethylene pentamine by heating to 425° F. where the reaction was complete. The ratio of polyamine to tall oil was 1 mol to 6 mols. The reaction product was made into a mixture of 70% kerosene and 30% reagent. The feed in both parts was a raw phosphate ore which had been deslimed and screened through 14 mesh, analyzing 25.90% BPL and 66.19% insolubles. In Part II the silica froth was refloated (cleaned) once to produce a middling which was the drop-out or underflow product.

*Part I.—Reagent, 2.15 lbs./ton conc.*

| Product | Percent BPL | Percent Insol. | Percent BPL Recovery |
|---|---|---|---|
| Concentrate | 64.50 | 17.43 | 88.8 |
| Tailing | 4.48 | 92.34 | 11.2 |

*Part II.—Reagent, 1.67 lbs./ton conc.*

| Product | Percent BPL | Percent Insol. | Percent BPL Recovery |
|---|---|---|---|
| Concentrate | 63.89 | 18.63 | 91.7 |
| Middling | 19.45 | 73.96 | 2.6 |
| Tailing | 2.34 | 95.95 | 5.7 |

EXAMPLE 19

In preparing the reagent, 408 grams (1.2 mol) of tall oil was reacted with 18.9 (0.1 mol) tetraethylene pentamine by heating to 415° F. where the reaction was complete. The ratio of polyamine to tall oil was 1 mol to 12 mols. The reaction product was made into a mixture of 70% kerosene and 30% reagent. The feed was a raw deslimed ore screened through 14 mesh and analyzing 25.90% BPL and 66.19% insolubles. The silica froth was refloated once to produce a middling which was the underflow product.

*Reagent, 1.65 lb./ton conc.*

| Product | Percent BPL | Percent Insol. | Percent BPL Recovery |
|---|---|---|---|
| Concentrate | 61.36 | 21.84 | 92.7 |
| Middling | 34.61 | 54.57 | 2.7 |
| Tailing | 1.92 | 96.48 | 4.6 |

EXAMPLE 20

In preparing the reagent, 612 grams (1.8 mol) of tall oil was reacted with 18.9 grams (0.1 mol) of tetraethylene pentamine by heating to 415° F. where the reaction was complete. The ratio of polyamine to tall oil was 1 mol to 18 mols. The reaction product was made into a mixture of 70% kerosene and 30% reagent. The feed was a raw phosphate ore, deslimed and screened through 14 mesh and analyzing 25.90% BPL and 66.19% insolubles. The silica froth was refloated once to produce a middling product as underflow which can be recirculated to the feed.

*Reagent, 2.76 lbs./ton conc.*

| Product | Percent BPL | Percent Insol. | Percent BPL Recovery |
|---|---|---|---|
| Concentrate | 48.64 | 37.03 | 95.2 |
| Middling | 16.15 | 78.84 | 1.2 |
| Tailing | 1.88 | 96.55 | 3.6 |

EXAMPLE 21

In preparing the reagent 204.0 grams (0.6 mol) of tall oil was reacted with 10.3 grams (0.1 mol) diethylene triamine by heating to 400° F. where the reaction was complete. The ratio of polyamine to tall oil was 1 mol to 6 mols. The reaction product was made into a mixture of 70% kerosene and 30% reagent. The feed was a raw phosphate ore which had been screened through 14 mesh and then deslimed and analyzed 39.97% BPL and 49.46% insolubles. The silica froth was refloated once to produce a middling product as underflow.

*Reagent, 1.00 lbs./ton conc.*

| Product | Percent BPL | Percent Insol. | Percent BPL Recovery |
|---|---|---|---|
| Concentrate | 57.51 | 27.20 | 93.7 |
| Middling | 9.90 | 87.71 | 1.5 |
| Tailing | 3.87 | 95.31 | 4.8 |

We claim:

1. The method of separating silica from a mixture of phosphatic material and silica, which comprises subjecting the phosphate-silica mixture to a flotation operation at a pH within the range of 6 to 9 and in the presence of the water-insoluble polymerization condensation reaction product resulting from reacting at a temperature within the range of 300 to 425° F. one molecular equivalent of a polyalkylene polyamine with from 2.5 to 18 molecular equivalents of a crude fatty product selected from the group consisting of tall oil and tall oil pitch, and recovering a phosphate concentrate in the underflow of the flotation operation while floating off silica.

2. The method of claim 1 in which the pH of the reaction product is within the range of 7.4 to 8.4.

3. The method of claim 1 in which a pulp of the silica float is subjected to a second flotation operation at a pH of at least 10 and in the presence of a small amount of fuel oil, and recovering a phosphate concentrate in the overflowing float and discharging silica in the underflowing tailings of said second flotation operation.

4. The method of claim 3 in which a pulp of the phosphate concentrate in the overflowing float is subjected to a further flotation operation at a pH between 6.5 and 7.5, and recovering a phosphate concentrate in the overflowing float and discharging silica in the underflowing tailings of said further flotation operation.

5. The method of claim 1 in which from 2.5 to 6 molecular equivalents of crude tall oil are reacted with one molecular equivalent of diethylene triamine.

6. The method of separating silica from a mixture of phosphatic material and silica, which comprises subjecting the phosphate-silica mixture to a flotation operation at a pH within the range of 6 to 9 and in the presence of the water-insoluble polymerization condensation reaction product resulting from reacting at a temperature within the range of 300 to 425° F. a mixture made up of one molecular equivalent of diethylene triamine and from 2.5 to 6 molecular equivalents of crude tall oil, recovering a phosphate concentrate in the underflow of the flotation operation while overflowing a silica float, subjecting a pulp of said silica float to a second flotation operation at a pH higher than 10 and in the presence of a small quantity of fuel oil, and recovering a phosphate concentrate in the overflowing float of said second flotation operation while underflowing a silica tailings.

7. The method of claim 6 in which a pulp of the phosphate concentrate in the overflowing float is subjected to a further flotation operation at a pH between 6.5 and 7.5, and recovering a phosphate concentrate in the overflowing float of said further flotation operation while underflowing a silica tailings.

8. The method of separating silica from a mixture of phosphatic material and silica, which comprises subjecting the phosphate-silica mixture to a flotation operation at a pH within the range of 6 to 9 and in the presence of the water-insoluble polymerization condensation reaction product resulting from reacting at a temperature within the range of 300 to 425° F. a mixture made up of one molecular equivalent of a polyalkylene polyamine and from 2.5 to 18 molecular equivalents of a crude fatty product selected from the group consisting of tall oil and tall oil pitch, said reaction product having an initial pH within the range of 7.4 to 8.4, recovering a phosphate concentrate in the underflow of the flotation operation while overflowing a silica float, subjecting a pulp of said silica float to a second flotation operation at a pH higher than 10 and in the presence of a small amount of fuel oil, and recovering a phosphate concentrate in the overflowing float of said second flotation operation while underflowing a silica tailings.

9. The method of claim 8 in which a pulp of the phosphate concentrate in said overflowing float is subjected to a further flotation operation at a pH within the range of 6.5 and 7.5, and recovering a phosphate concentrate in the overflowing float of said further flotation operation while underflowing a silica tailings.

10. The method of separating silica from a mixture of phosphatic material and silica, which comprises subjecting the phosphate-silica mixture to a flotation operation at a pH within the range of 6 to 9 and in the presence of the water-insoluble polymerization condensation reaction product resulting from reacting at a temperature within the range of 300 to 425° F. one molecular equivalent of tetraethylene pentamine with from 2.5 to 18 molecular equivalents of a crude fatty product selected from the group consisting of tall oil and tall oil pitch, and recovering a phosphate concentrate in the underflow of the flotation operation while floating off silica.

11. The method of separating silica from a mixture of phosphatic material and silica, which comprises subjecting the phosphate-silica mixture to a flotation operation at a pH within the range of 6 to 9 and in the presence of the water-insoluble polymerization condensation reaction product resulting from reacting at a temperature within the range of 300 to 425° F. one molecular equivalent of triethylene tetramine with from 2.5 to 12 molecular equivalents of a crude fatty product selected from the group consisting of tall oil and tall oil pitch, and recovering a phosphate concentrate in the underflow of the flotation operation while overflowing a silica float.

12. The method of separating silica from a mixture of phosphatic material and silica, which comprises subjecting the phosphate-silica mixture to a flotation operation at a pH within the range of 6 to 9 and in the presence of the water-insoluble polymerization condensation reaction product resulting from reacting at a temperature within the range of 300 to 425° F. a mixture made up of one molecular equivalent of diethylene triamine and from 2.5 to 6 molecular equivalents of a crude fatty product selected from the group consisting of tall oil and tall oil pitch, and recovering a phosphate concentrate in the underflow of the flotation operation while overflowing a silica float.

13. The method of separating silica from a mixture of phosphatic material and silica, which comprises subjecting the phosphate-silica mixture to a flotation operation at a pH within the range of 6 to 9 and in the presence of the water-insoluble polymerization condensation reaction product resulting from reacting at a temperature within the range of 300 to 425° F. a mixture made up of one molecular equivalent of a polyalkylene polyamine selected from the group consisting of diethylene triamine, triethylene tetramine and tetraethylene pentamine and from 2.5 to 18 molecular equivalents of a crude fatty product selected from the group consisting of tall oil and tall oil pitch, recovering a phosphate concentrate in the underflow of the flotation operation while overflowing a silica float, and subjecting a pulp of said silica float to a second flotation operation at a pH higher than 10 and in the presence of a small amount of fuel oil, recovering a phosphate concentrate in the overflowing float of said second flotation operation while underflowing a silica tailings.

14. The method of claim 13 in which a pulp of the phosphate concentrate in said overflowing float is subjected to a further flotation operation at a pH within the range of 6.5 and 7.5, and recovering a phosphate concentrate in the overflowing float of said further flotation operation while underflowing a silica tailings.

References Cited in the file of this patent

UNITED STATES PATENTS

| | | |
|---|---|---|
| 2,278,060 | Christmann et al. | Mar. 31, 1942 |
| 2,368,968 | Christmann | Feb. 6, 1945 |
| 2,494,132 | Jayne et al. | Jan. 10, 1950 |
| 2,569,417 | Jayne et al. | Sept. 25, 1951 |
| 2,569,680 | Leek | Oct. 2, 1951 |
| 2,578,790 | Duke | Dec. 18, 1951 |
| 2,633,240 | Bishop | Mar. 31, 1953 |
| 2,772,179 | Kalinowski et al. | Nov. 27, 1956 |